(12) United States Patent
Grant

(10) Patent No.: US 11,519,549 B2
(45) Date of Patent: Dec. 6, 2022

(54) PORTABLE MOBILE DEVICE HOLDER

(71) Applicant: CallMe, Inc., Atlanta, GA (US)

(72) Inventor: Antonio Mauricio Grant, Smyrna, GA (US)

(73) Assignee: CALLME, INC., Atlanta, GA (US)

( * ) Notice: Subject to any disclaimer, the term of this patent is extended or adjusted under 35 U.S.C. 154(b) by 0 days.

(21) Appl. No.: 17/158,279

(22) Filed: Jan. 26, 2021

(65) Prior Publication Data

US 2022/0235899 A1 Jul. 28, 2022

(51) Int. Cl.
*F16M 11/12* (2006.01)
*A45F 5/00* (2006.01)

(52) U.S. Cl.
CPC ............. *F16M 11/126* (2013.01); *A45F 5/00* (2013.01); *A45F 2005/002* (2013.01); *A45F 2200/0516* (2013.01)

(58) Field of Classification Search
CPC ... F16M 11/126; A45F 5/00; A45F 2005/002; A45F 2005/05; A45F 2005/0525; A45F 2005/0508; A45F 2200/0516; G06F 1/1698
See application file for complete search history.

(56) References Cited

U.S. PATENT DOCUMENTS

| | | | | |
|---|---|---|---|---|
| 4,146,308 A * | 3/1979 | Cohen | ................... | G02B 7/182 359/865 |
| 4,483,505 A * | 11/1984 | Dalbo | ................... | A47B 19/08 248/447 |
| 4,972,982 A * | 11/1990 | Harbour | ................... | B44D 3/14 224/617 |
| 5,029,784 A * | 7/1991 | Blahout | ................ | A47F 7/0057 248/460 |
| 5,436,792 A * | 7/1995 | Leman | ................... | F16M 13/00 361/755 |
| 8,418,629 B2 * | 4/2013 | Yu | .............................. | A45F 5/00 108/43 |
| 8,534,634 B2 * | 9/2013 | Hu | ....................... | F16M 11/041 248/370 |
| 9,013,865 B2 * | 4/2015 | Chen | ..................... | G06F 1/1626 361/679.21 |
| 9,062,823 B2 * | 6/2015 | Pan | ........................ | F16M 13/00 |
| 9,086,123 B2 * | 7/2015 | Vezain | ................... | F16M 11/18 |
| 9,706,830 B1 * | 7/2017 | Prince | ................... | H04B 1/3888 |
| 9,723,116 B2 * | 8/2017 | Georges | .................... | A45F 5/00 |

(Continued)

*Primary Examiner* — Nkeisha Smith
(74) *Attorney, Agent, or Firm* — Jordan IP Law, LLC; Todd A. Vaughn

(57) ABSTRACT

A portable mobile device holder that includes a plurality of concentrically-connected frames. The intermediate protective frame, is selectively moveable by a user between a stowed position and a deployed position in which the intermediate protective frame is pivoted outwardly relative to the outer protective frame to orient the mobile device at an approximately 90 degree position relative to the outer protective frame and facilitate hands-free use of the mobile device by a user. The mobile device is mounted on the inner protective frame defining, which is selectively moveable by the user between a stowed position and a deployed position in which the inner protective frame is selectively rotated by the user between approximately 0 to 360 degrees about its longitudinal axis relative to the intermediate protective frame.

17 Claims, 9 Drawing Sheets

(56) References Cited

U.S. PATENT DOCUMENTS

| | | | | |
|---|---|---|---|---|
| 10,419,054 B1* | 9/2019 | VanTassell | ............... | H04M 1/04 |
| 10,470,544 B2* | 11/2019 | Adrain | ................... | A45C 15/00 |
| 10,533,700 B1* | 1/2020 | Mulhall | ............... | F16M 13/005 |
| 11,073,237 B2* | 7/2021 | Zhao | .................... | F16M 11/126 |
| 11,092,881 B2* | 8/2021 | Qian | .................. | F16M 11/2064 |
| 2012/0275131 A1* | 11/2012 | Huang | ................... | H05K 5/023 |
| | | | | 248/176.1 |
| 2015/0237997 A1* | 8/2015 | Bruns | .................... | A45F 5/021 |
| | | | | 224/191 |
| 2016/0081505 A1* | 3/2016 | Berg | ......................... | A45F 5/00 |
| | | | | 224/401 |
| 2016/0353867 A1* | 12/2016 | Due | .......................... | A45F 5/10 |
| 2017/0152990 A1* | 6/2017 | Kielland | ............... | G06F 1/1626 |
| 2017/0172267 A1* | 6/2017 | Bong | ..................... | A45C 11/00 |
| 2017/0215293 A1* | 7/2017 | Merenda | ............ | B65H 75/4434 |
| 2017/0251793 A1* | 9/2017 | Barratt | ................... | F16M 11/28 |
| 2019/0195418 A1* | 6/2019 | Yan | .......................... | F16B 2/12 |
| 2020/0083921 A1* | 3/2020 | Hogue | .................. | A45C 11/00 |
| 2020/0337448 A1* | 10/2020 | Grinnell | .................... | A45F 5/06 |

\* cited by examiner

PORTABLE MOBILE DEVICE HOLDER

TECHNICAL FIELD

One or more embodiments relate generally to a portable mobile device holder. In particular, one or more embodiments relate generally to a portable mobile device holder having a structural design that is lightweight yet protects the mobile device against damage from drops while also facilitating hands-free support by a user in a plurality of orientations.

BACKGROUND

Mobile device holders are generally designed as a single shell or frame intended to provide adequate protection against damage to the mobile device.

BRIEF SUMMARY

One or embodiments relate to a portable mobile device holder that is lightweight, yet has a structural design that protects the mobile device against damage from unintended drops.

One or embodiments relate to a portable mobile device holder having a structural design that also functions as a stand, facilitating selective orientation of the mobile device between a portrait mode and a landscape mode.

One or embodiments relate to a portable mobile device holder having a structural design that is securable to the body of the user at two regions (neck, and lower torso) to facilitate support that enables hands-free use of the mobile device by a user to engage in A-V conversations, watch videos, record videos, take pictures, browsing the Internet, etc., all while also engaged in activities such as, for example, running, walking, skiing, surfing, skydiving, zip-lining, etc.

In accordance with one or more embodiments, a portable mobile device holder comprises one or more of the following: an outer protective frame, defining an opening; an intermediate protective frame, concentrically received in the opening of the outer protective frame and defining an opening, the intermediate protective frame being selectively moveable by a user between a stowed position and a deployed position in which the intermediate protective frame is pivoted outwardly relative to the outer protective frame to orient the mobile device at an approximately 90 degree position relative to the outer protective frame and facilitate hands-free use of the mobile device by a user; and an inner protective frame, concentrically received in the opening of the intermediate protective frame and defining an opening into which the mobile device is mounted, the inner protective frame being selectively moveable by the user between a stowed position and a deployed position in which the inner protective frame is selectively rotated by the user between approximately 0 to 360 degrees about its longitudinal axis relative to the intermediate protective frame.

In accordance with one or more embodiments, a portable mobile device holder comprises one or more of the following: an outer protective frame, defining an opening configured to concentrically receive an inner protective frame, which itself defines an opening into which the mobile device is mounted, the inner protective frame being selectively moveable by the user between a stowed position and a deployed position in which the inner protective frame is selectively rotated by the user between approximately 0 to 360 degrees about its longitudinal axis relative to the outer protective frame. In particular, when the intermediate frame is selectively pivoted to an approximately 90 degree position, the inner protective frame is selectively rotated by the user to an approximately 180 degree position in a manner that the display of the mobile device is facing the user.

In accordance with one or more embodiments, a portable mobile device holder comprises one or more of the following: a plurality of individual frames, concentrically-connected to each other to receive the mobile device at an inner protective frame of the individual frames, wherein an intermediate protective frame of the individual frames is selectively moveable by a user between a stowed position and a deployed position in which the intermediate protective frame is pivoted outwardly relative to an outer protective frame of the individual frames to thereby orient the mobile device at an approximately 90 degree position relative to the outer protective frame and facilitate hands-free use of the mobile device by a user.

In accordance with one or more embodiments, the inner protective frame comprises one or more of: a first lock device, selectively moveable in a vertical direction relative to the inner protective frame, to engage and lock the mobile device to the inner protective frame; and a second lock device, selectively moveable in a lateral direction relative to the inner protective frame, to engage and lock the mobile device to the inner protective frame.

In accordance with one or more embodiments, the outer protective frame comprises a substantially rectangular-shaped body having a plurality of frame protector members arranged at corners thereof.

In accordance with one or more embodiments, the outer protective frame comprises one or more of: spaced-apart connection members extending towards the opening of the outer protective frame to facilitate connection of the intermediate protective frame to the outer protective frame and the outward pivoting of the intermediate protective frame relative to the outer protective frame, and a stop member, extending substantially perpendicularly from the outer protective frame, to engage and maintain the intermediate protective frame at approximately 90 degree position relative to the outer protective frame.

In accordance with one or more embodiments, the portable mobile device holder further comprises a first stand member, operatively connected to the outer protective frame, and moveable between a stowed position at a rear surface of the outer protective frame, and a deployed position in which the first stand member is pivoted outwardly from the outer protective frame to support the portable mobile device holder at a portrait orientation.

In accordance with one or more embodiments, the portable mobile device holder further comprises a second stand member, operatively connected to the outer protective frame, and moveable between a stowed position at a rear surface of the outer protective frame, and a deployed position in which the second stand member is pivoted outwardly from the outer protective frame to support the portable mobile device holder at a landscape orientation.

In accordance with one or more embodiments, the intermediate protective frame comprises a lock/release member, configured to engage the outer protective frame and maintain the intermediate protective frame in the stowed position, and selectively release the intermediate protective frame from the stowed position to the deployed position when engaged by the user.

DRAWINGS

The various advantages of the embodiments of the present invention will become apparent to one skilled in the art by reading the following specification and appended claims, and by referencing the following drawings, in which:

Figure 1:
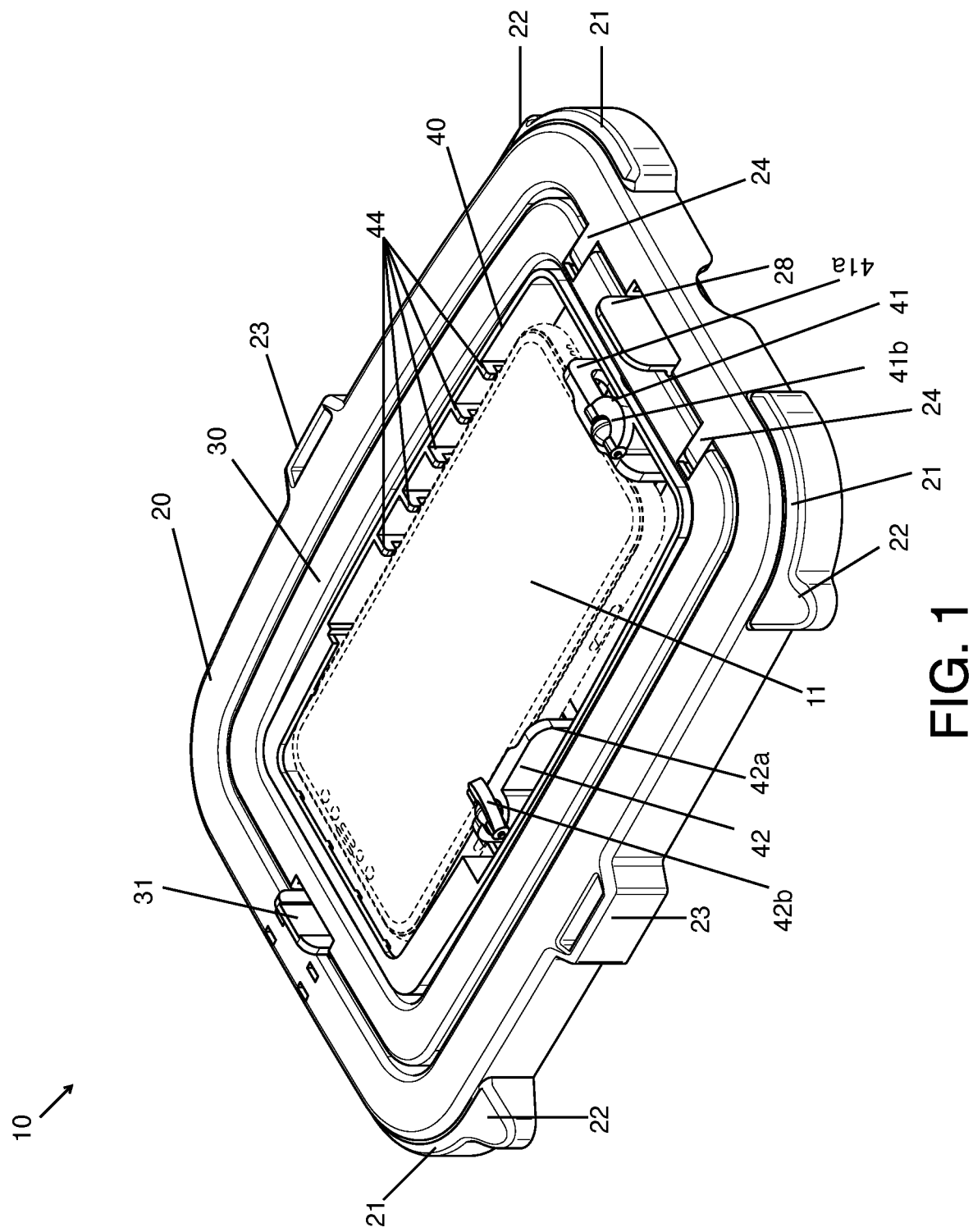
FIG. 1 illustrates a perspective view of a portable mobile device holder, in accordance with one or more embodiments.
Figure 4:
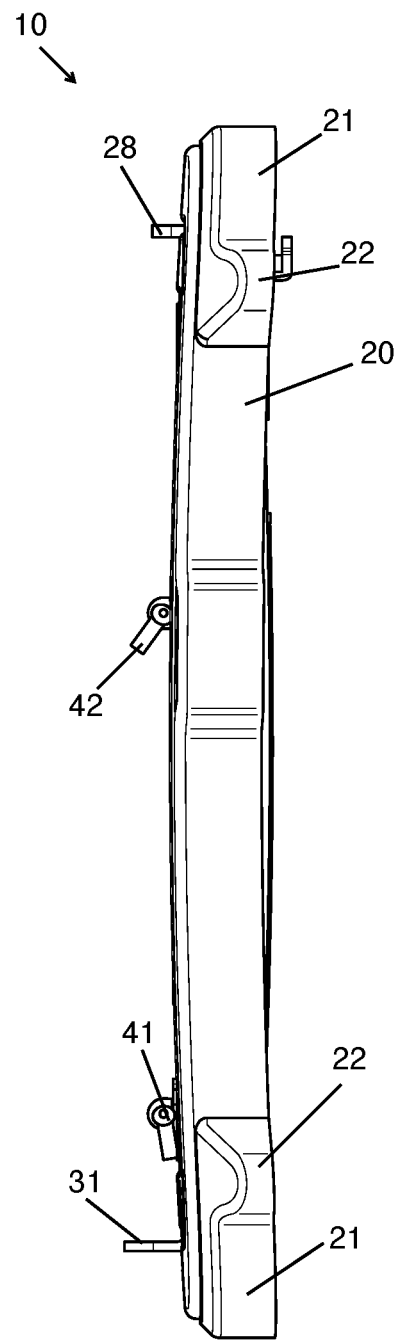
Figure 5:
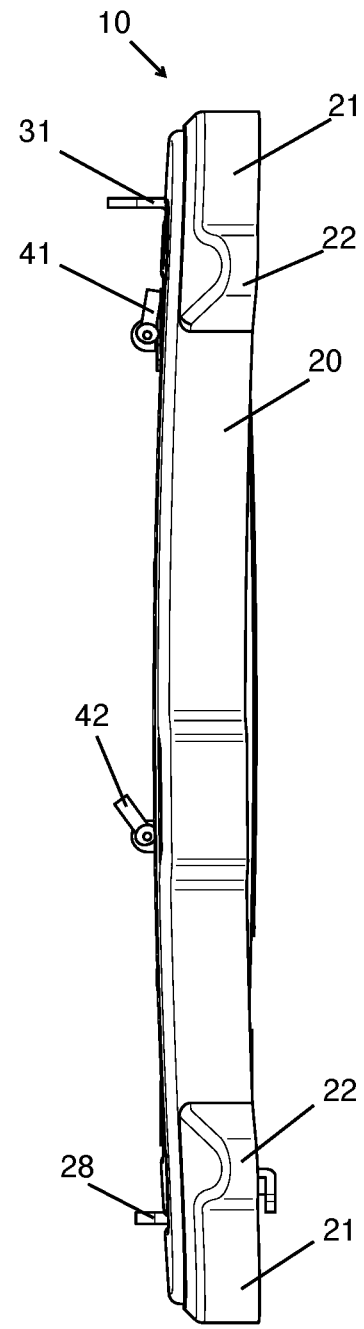

FIGS. 4 and 5 respectively illustrate a side view of the portable mobile device holder of FIG. 1.

Figure 6:
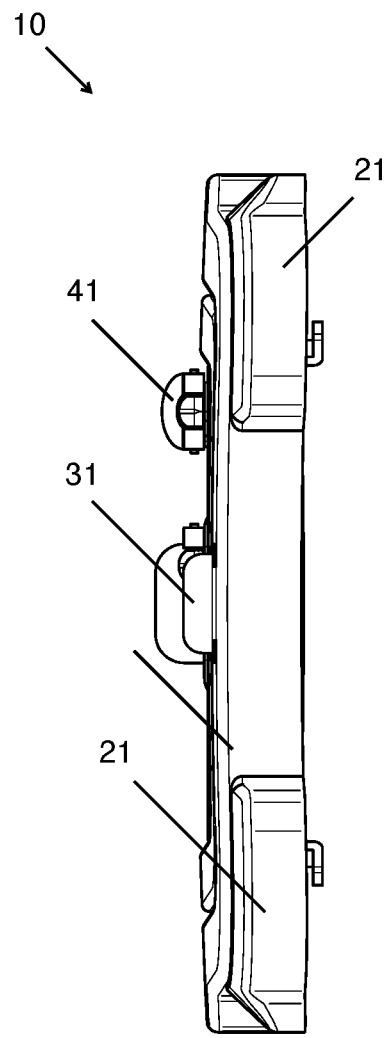

FIG. 6 illustrates a top view of the portable mobile device holder of FIG. 1.

Figure 7:
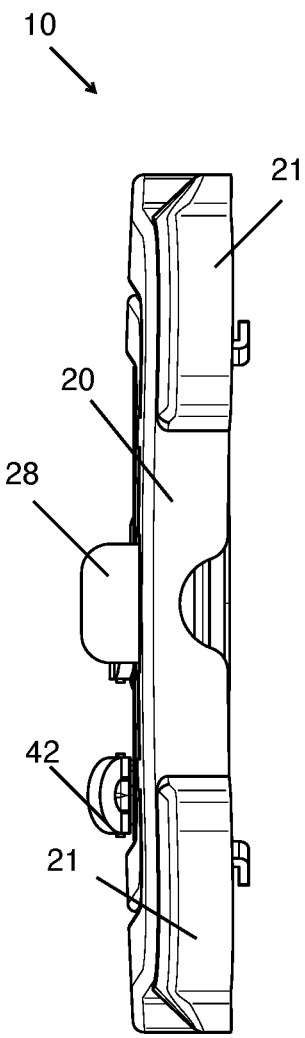

FIG. 7 illustrates a bottom view of the portable mobile device holder of FIG. 1.

Figure 8:
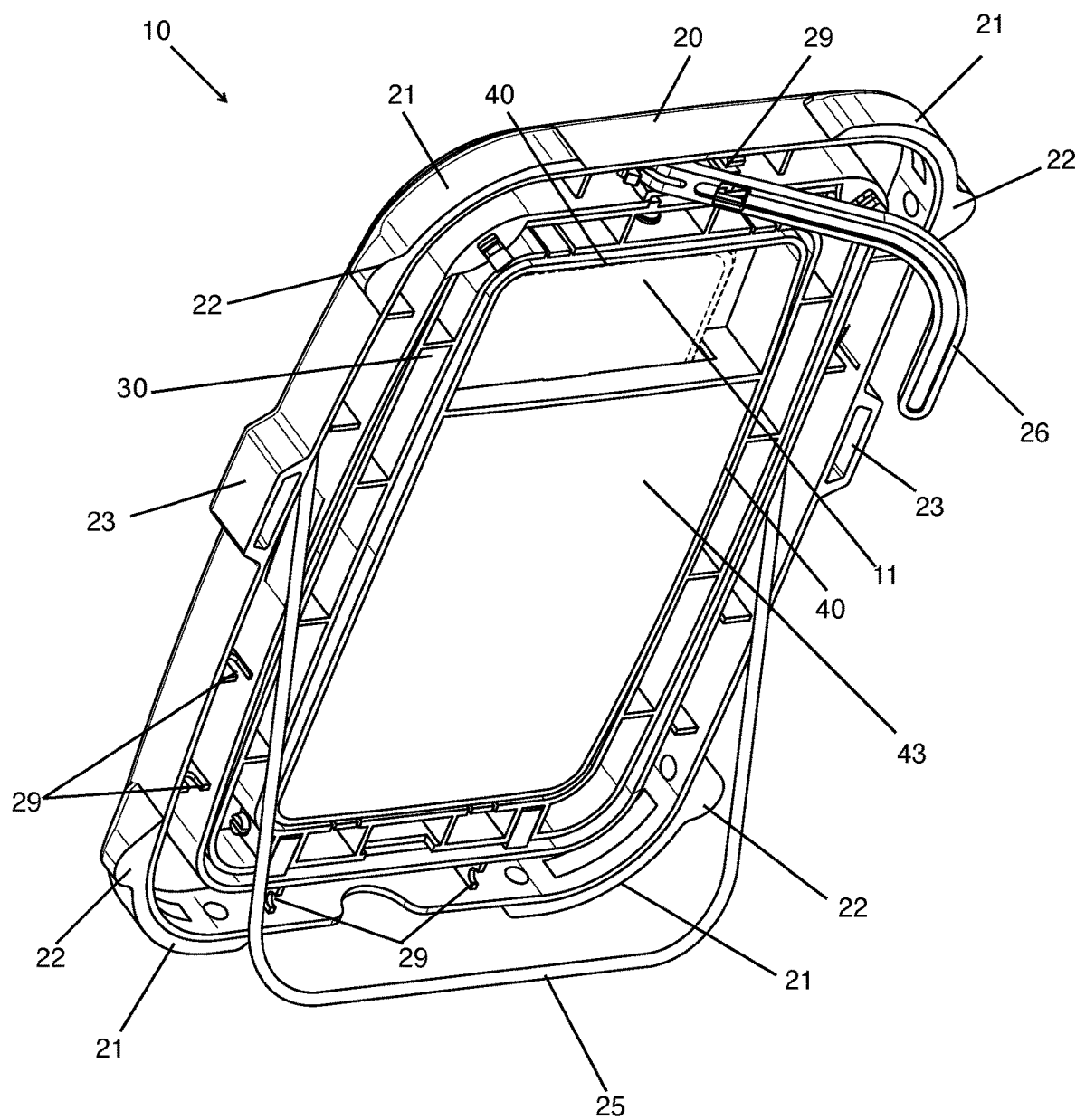

FIG. 8 is a rear perspective view of the portable mobile device holder of FIG. 1, with deployment of the first stand member and the second stand member.

Figure 9:
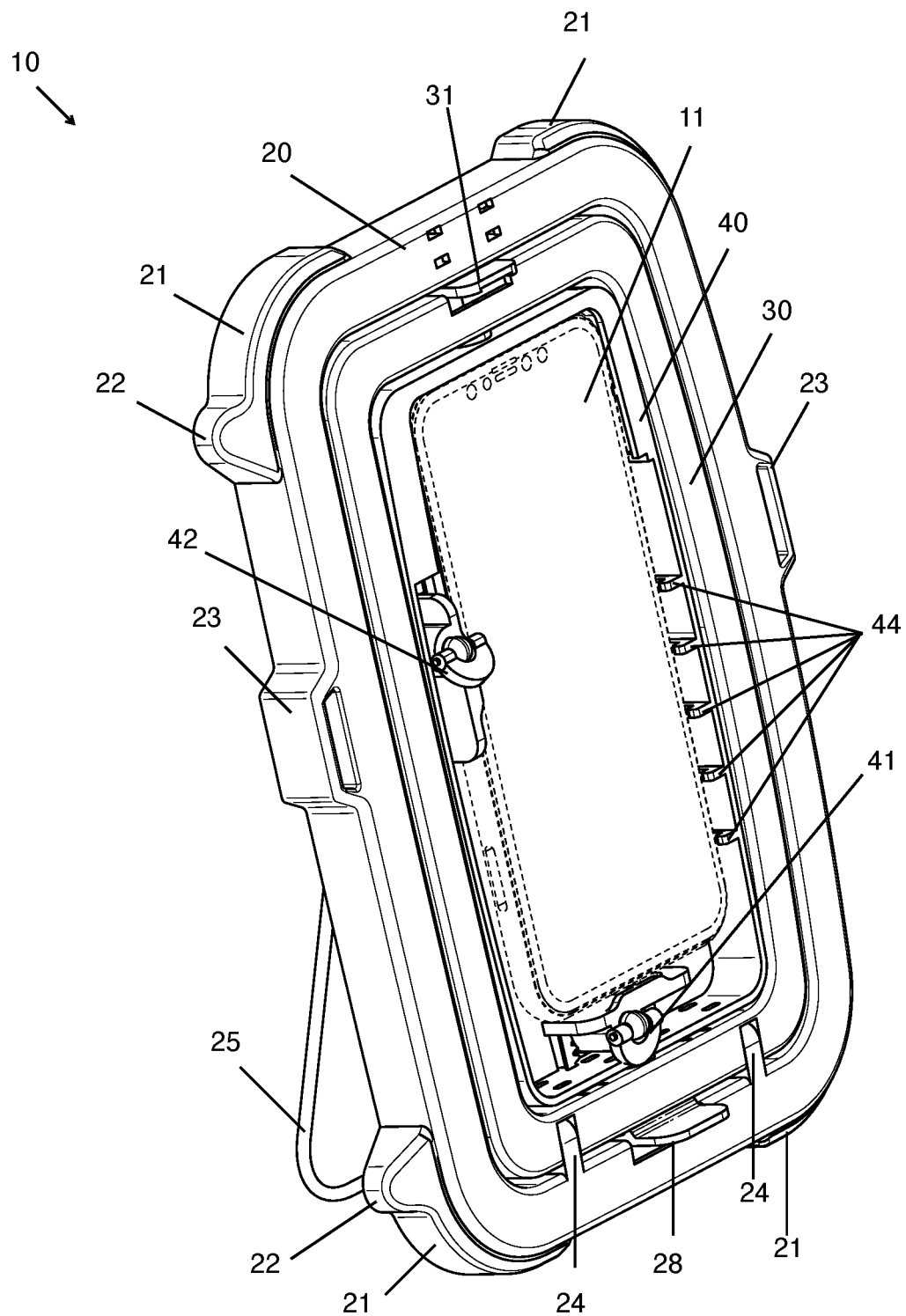

FIG. 9 is a front perspective view of the portable mobile device holder of FIG. 1, with deployment of the first stand member.

Figure 10:
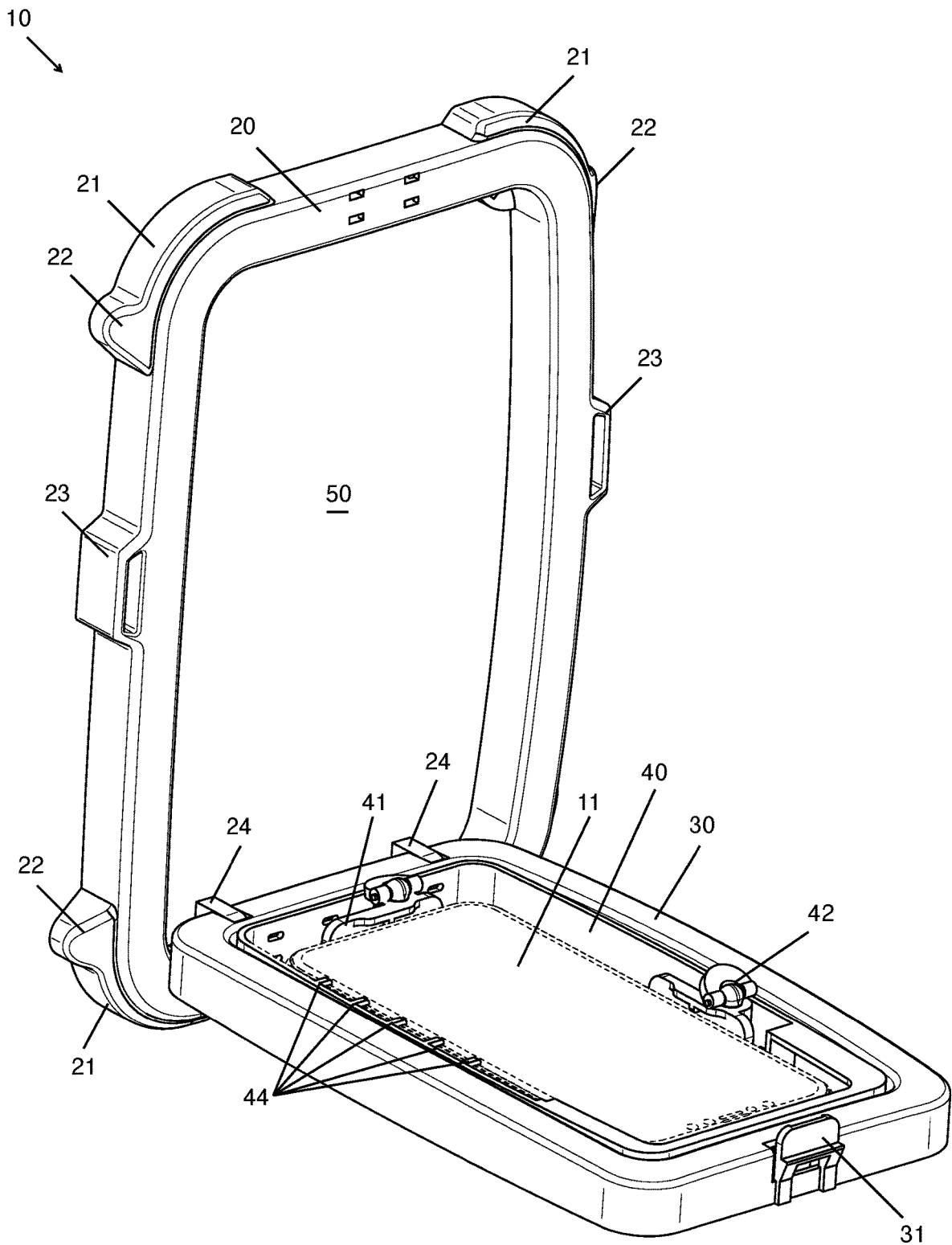

FIG. 10 is a front perspective view of the portable mobile device holder of FIG. 1, with the mobile device at an approximately 90 degree orientation.

Figure 11:
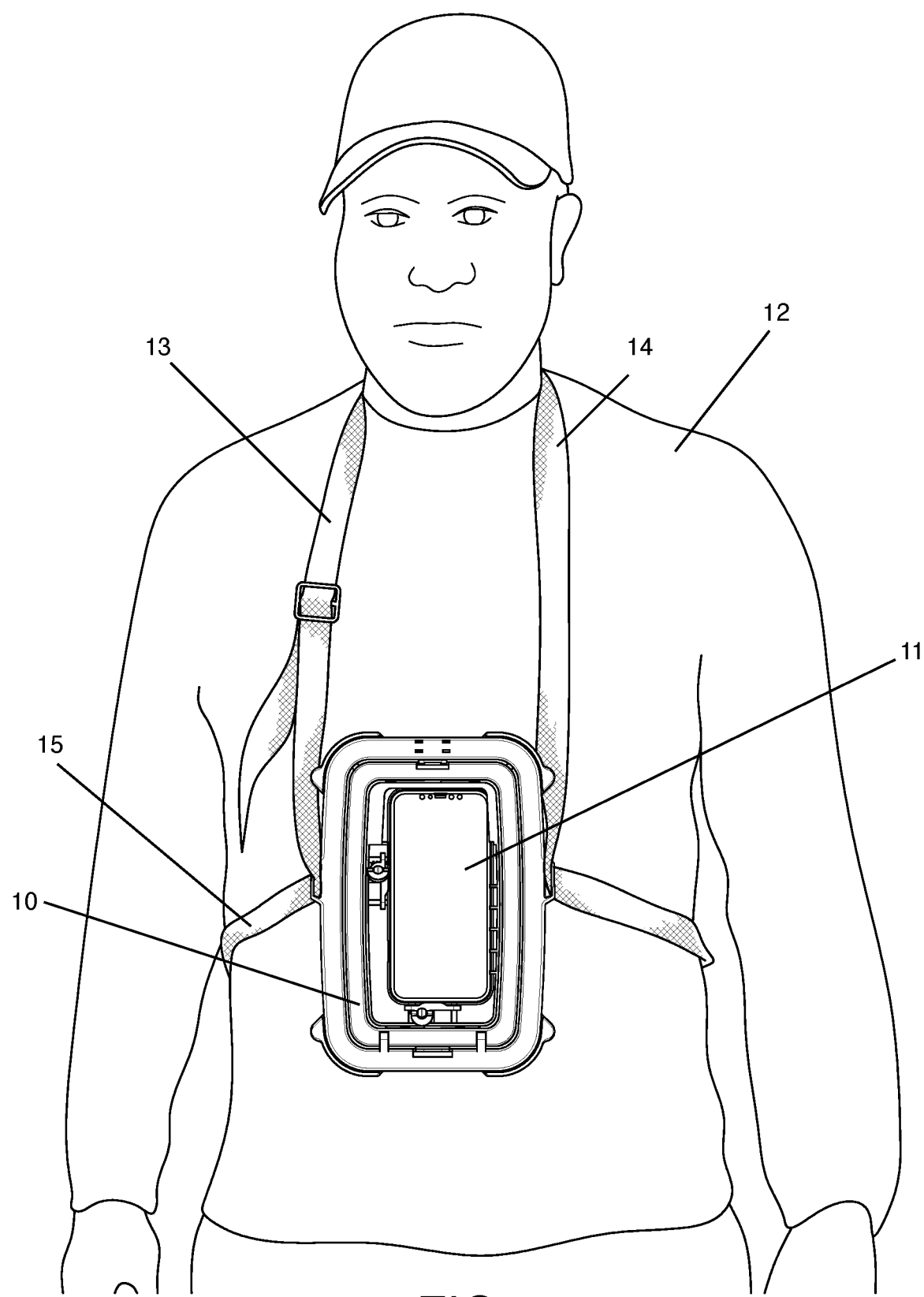

FIG. 11 is a front perspective view of the portable mobile device holder being held by a user in a hands-free position.

DETAILED DESCRIPTION

Turning to the figures, in which FIGS. 1 through 11, which respectively illustrate a portable mobile device holder 10 comprising an outer protective frame 20, an intermediate protective frame 30, and an inner protective frame 40 that is configured to receive and support a mobile device 11. The outer protective frame 20, the intermediate protective frame 30, and the inner protective frame 40 may respectively have a structural configuration that facilitates uninterrupted use of the microphone, video, a speaker module(s) of the mobile device 11 while the mobile device 11 is supported by the portable mobile device holder 10.

In accordance with one or more embodiments, the outer protective frame 20, the intermediate protective frame 30, and the inner protective frame 40 may respectively be composed of a moldable polymer material exhibiting good mechanical properties and high thermal resistivity. Embodiments, however, are not limited therewith, and thus, this disclosure contemplates the outer protective frame 20, the intermediate protective frame 30, and the inner protective frame 40 being composed of any suitable material(s) that falls within the spirit and scope of the principles of this disclosure set forth herein. The outer protective frame 20, the intermediate protective frame 30, and the inner protective frame 40 may be composed of the same material.

As illustrated in FIG. 1, in an initial orientation of the portable mobile device holder 10, the outer protective frame 20, the intermediate protective frame 30, and the inner protective frame 40 are coplanar to each other. When mounted in the portable mobile device holder 10, the mobile device 11 is also coplanar to the outer protective frame 20, the intermediate protective frame 30, and the inner protective frame 40. Although illustrated examples illustrate a mobile phone as the mobile device 11 supported by the portable mobile device holder 10, embodiments are not limited therewith. Thus, this disclosure contemplates the mobile device 11 comprising any portable mobile device that falls within the spirit and scope of the principles of this disclosure set forth herein. As an example and not by way of limitation, the mobile device 11 can comprise a netbook, a tablet computer, an e-book reader, a GPS device, a camera, a personal digital assistant (PDA), a handheld electronic device, a cellular telephone, a smart phone, mobile Internet device/MID, a wearable device, other suitable electronic device, or any suitable combination thereof.

Figure 2:
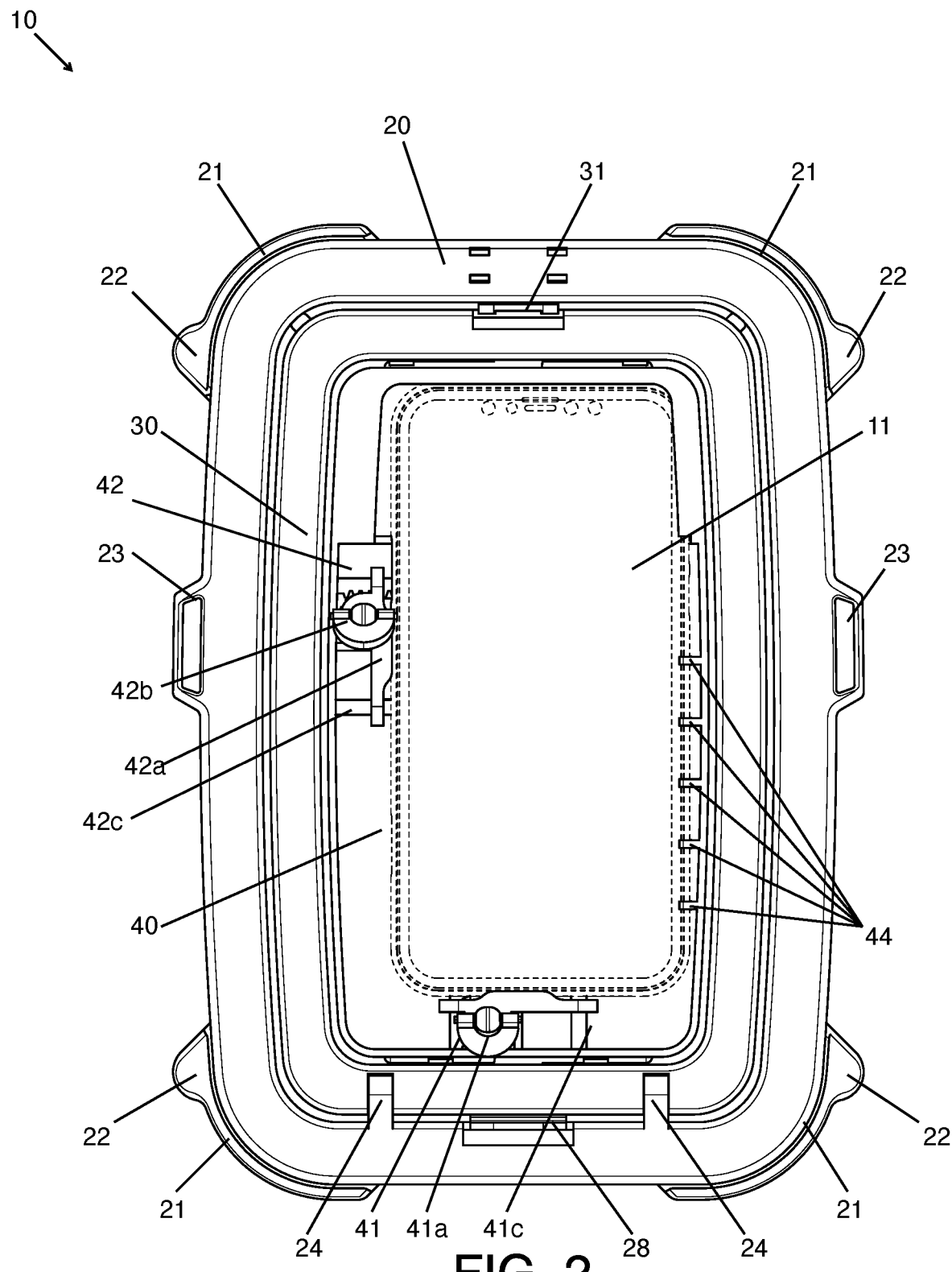
FIG. 2 illustrates a front view of the portable mobile device holder of FIG. 1.
Figure 3:
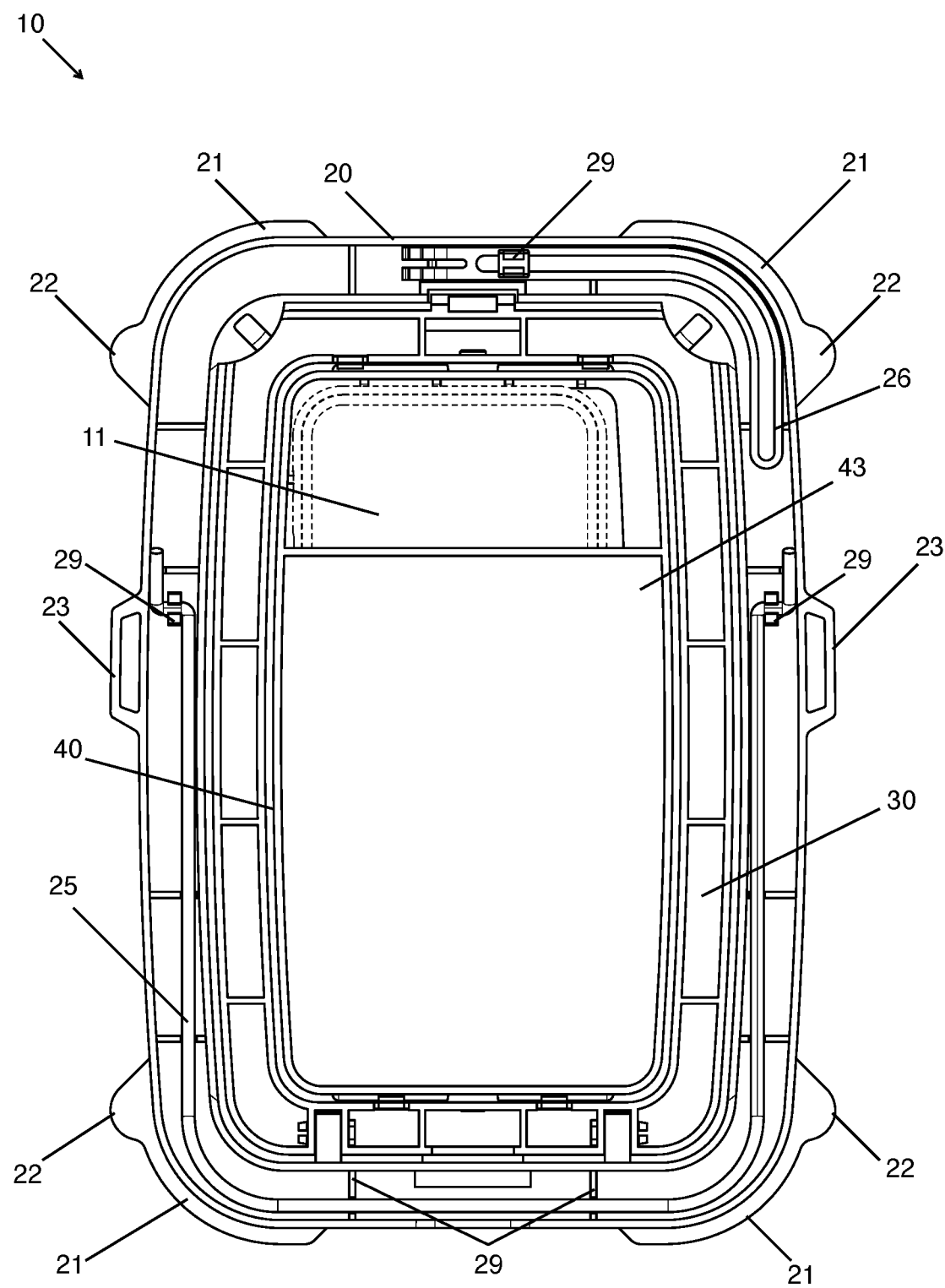
FIG. 3 illustrates a rear view of the portable mobile device holder of FIG. 1.

As illustrated in FIGS. 2 and 3, the outer protective frame 20 comprises a substantially rectangular-shaped body defining an opening sized to concentrically receive the intermediate protective frame 30, which is operatively connected thereto via connection members 24.

A plurality of frame protection members 21 are arranged at corners of the outer protective frame 20 to protect the mobile device 11 should a user drop the portable mobile device holder 10. Each frame protection member 21 comprises at a distal end thereof a bumper member 22 that serve as feet upon which the portable mobile device holder 10 rests when placed on a surface. This disclosure contemplates the frame protection members 21 being formed unitary with the outer protective frame 20, or alternatively, as a separate component that is attached (e.g., via a suitable adhesive) to the outer protective frame 20. An example of a separately-formed outer protective frame 20 may be composed of rubber or a suitable material exhibiting good impact resistance.

Additionally or alternatively, the outer protective frame 20 further comprises one or more connection members 24. Each connection member 24 extends towards the opening of the outer protective frame 20 to facilitate a pivotal connection of the intermediate protective frame 30 to the outer protective frame 40. The pivotal connection facilitates pivoting of the intermediate protective frame 30 relative to the outer protective frame 20 between approximately 0 to 90 degrees. To prevent rotation of the intermediate protective frame 30 beyond a threshold approximately 90 degrees, a bottom region of the outer protective frame 20 further comprises a stop member 28 that extends substantially perpendicularly from the outer protective frame 20. The stop member 28 is configured to serve as a platform which is to be engaged by the front, bottom surface of the intermediate protective frame 30 when the intermediate protective frame 30 is pivoted approximately 90 degrees. The stop member 28 is configured to maintain the intermediate protective frame 30 at the approximately 90 degree position relative to the outer protective frame 20 to facilitate hands-free use of the mobile device by a user to engage in A-V conversations, watch videos, record videos, take pictures, browsing the Internet, etc., all while also engaged in activities such as, for example, running, walking, skiing, surfing, skydiving, ziplining, etc.

The intermediate protective frame 30 defines an opening sized to concentrically receive the inner protective frame 40. The intermediate protective frame 30, via connection members 24, is selectively moveable by a user 12 between a stowed position (FIG. 1) in which the intermediate protective frame 30 is coplanar to the outer protective frame 20 and the inner protective frame 40, and a deployed position (FIG. 10) in which the intermediate protective frame 30 is pivoted outwardly such that it is in a plane that is substantially perpendicular to the plane of the outer protective frame 20. Meaning, the connection between the outer protective frame 20 and the intermediate protective frame 30 facilitates orientation of the mobile device 11 in at a position that facilitates hands-free use of the mobile device 11. In particular, in such an orientation, in combination with rotation of the inner frame 40 approximately 180 degrees, will enable hands-free use of the mobile device 11 in a way that the user 12 can engage in A-V conversations, watch videos, record videos, take pictures, browsing the Internet, etc., all while also engaged in activities such as, for example, running, walking, skiing, surfing, skydiving, zip-lining, etc.

Additionally or alternatively, the intermediate protective frame 30 comprises a lock/release member 31 arranged at an upper lateral sidewall thereof. The lock/release member 31 is configured to maintain the intermediate protective frame 30 in the stowed position, and selectively release the intermediate protective frame 30 from the stowed position to the deployed position when engaged by the user. When engaged by a user, for example, by being pressed downwardly, the intermediate protective frame 30 is released from the upper connection with the outer protective frame 20 to facilitate selective pivoting of the intermediate protective frame 30 at the approximately 90 degree position relative to the outer protective frame 20.

The inner protective frame 40 is concentrically received in the opening of the intermediate protective frame 30, and defines an opening into which the mobile device 11 is securely mounted. The inner protective frame 40 is selectively moveable by the user 12 between a stowed position in which the inner protective frame 40 is coplanar to the outer protective frame 20 and the intermediate protective frame 30, and a deployed position in which the inner protective frame is selectively rotated by the user between approximately between 0 to 360 degrees about its longitudinal axis relative to the intermediate protective frame 30.

In accordance with one or more embodiments, in order to maintain the position of the mobile device 11 once mounted, the inner protective frame 40 comprises a first lock device 41 at a bottom region thereof, a second lock device 42 at a lateral region thereof, a rear support 43, and a plurality of spaced apart ribs 44. The rear support 43 has a configuration that does not block the camera module of the mobile device 11.

The first lock device 41 comprises platform member 41$a$ operatively connected to a manual adjustment member 41$b$. Selective rotation of the manual adjustment member 41$b$ by the user 12 in a clockwise direction facilitates upward movement of the platform member 41$a$ on one or more tracks 41$c$ in a longitudinal direction to facilitate direct engagement of the platform member 41$a$ with a peripheral sidewall of the mobile device 11. Such direct engagement applies a contact force on the mobile device 11 which is to restrict movement of the mobile device 11 in the longitudinal direction. Selective rotation of the manual adjustment member 41$b$ by the user 12 in a counterclockwise direction facilitates downward movement of the platform member 41$a$ in the longitudinal direction along the tracks 41$c$ to facilitate disengagement of the platform member 41$a$ with the peripheral sidewall of the mobile device 11. Such disengagement reduces or otherwise eliminates the contact force on the mobile device 11, which thereby enables movement of the mobile device 11 in the longitudinal direction. Which in turn, permits removal of the mobile device 11 from the inner protective frame 40.

The second lock device 42 comprises platform member 42$a$ operatively connected to a manual adjustment member 42$b$. Selective rotation of the manual adjustment member 42$b$ by the user 12 in a clockwise direction facilitates lateral movement of the platform member 42$a$ on one or more tracks 42$c$ in a lateral direction (towards the right) to facilitate direct engagement of the platform member 42$a$ with a peripheral sidewall of the mobile device 11. Such direct engagement applies a contact force on the mobile device 11 which is to restrict movement of the mobile device 11 in the lateral direction. Each rib 44 comprises an L-shaped configuration that may engage the lateral sidewall and a portion of the display of the mobile device 11 in a manner that prevents unexpected release of the mobile device 11 from the inner protective frame 40. Selective rotation of the manual adjustment member 42$b$ by the user 12 in a counterclockwise direction along the tracks 42$c$ facilitates lateral movement of the platform member 42$a$ in the longitudinal direction (towards the left) to facilitate disengagement of the platform member 42$a$ with the peripheral sidewall of the mobile device 11. Such disengagement reduces or otherwise eliminates the contact force on the mobile device 11, which thereby enables movement of the mobile device 11 in the lateral direction. Which in turn, permits removal of the mobile device 11 from the inner protective frame 40.

The outer surface of the bottom lateral sidewall of the inner protective frame 40 includes a stem member extending in a downward longitudinal direction to be received by a corresponding hole in the inner surface of the bottom lateral sidewall of the intermediate protective frame 30. The rotational connection between the intermediate protective frame 30 and the inner protective frame 40 advantageously facilitates selective rotation of the inner protective frame 40 by the user 12.

For example, when the intermediate protective frame 30 is in a stowed position, the user 12 may selectively rotate the inner protective frame 40 from a position in which the display faces outwardly away from the body of the user 12 to a second position in which the display faces inwardly towards the body of the user 12. In that way, the display of the mobile device 11 is shielded by the body of the user 12 to prevent exposure of the display to undesirable moisture, debris, or impact by one or more objects. The user 12 may then selectively rotate the inner protective frame 40 to the first position (display facing outwardly away from the body of the user 12) to facilitate use of the video camera of the mobile device 11.

In another example, when the intermediate protective frame 30 is pivoted to the deployed position (approximately 90 degrees), the user 12 may selectively rotate the inner protective frame 40 from a position in which the display faces downwardly away from the body of the user 12 to a second position in which the display faces upwardly towards the body of the user 12. In that way, the display of the mobile device 11 is accessible by the user 12 in a manner that permits use of the user interface of the mobile device 11.

As illustrated in FIGS. 8 and 9, additionally or alternatively, the portable mobile device holder 10 further comprises a first stand member 25 operatively connected to the outer protective frame 20 at two connections points. Each connection point is located at a recessed rear region of a longitudinal sidewall of the outer protective frame 20. The first stand member 25 is configured for pivotal movement between a stowed position in which the first stand member 25 is positioned in a recessed rear region of the outer protective frame 20, and a deployed position in which the first stand member 25 is pivoted outwardly from the outer protective frame 20 to support the portable mobile device holder 10 at a portrait orientation of the mobile device 11. The first stand member 25 may be composed of a material exhibiting good mechanical properties and high thermal resistivity. Such a material may comprise, for example, a metal material, a polymer material, a composite material, or combinations thereof. Embodiments, however, are not limited therewith, and thus, this disclosure contemplates the first stand member 25 being composed of any suitable material(s) that falls within the spirit and scope of the principles of this disclosure set forth herein.

Additionally or alternatively, the portable mobile device holder 10 further comprises a second stand member 26 operatively connected to the outer protective frame 20 at a connection point located at a recessed rear region of an upper lateral sidewall of the outer protective frame 20. The second stand member 26 is configured for pivotal movement between a stowed position in which the second stand member 26 is positioned at a recessed rear surface of the outer protective frame 20, and a deployed position in which the second stand member 26 is pivoted outwardly from the outer protective frame 20 to support the portable mobile device holder 10 at a landscape orientation of the mobile device 11. The second stand member 26 may be composed of a material exhibiting good mechanical properties and high thermal resistivity. Such a material may comprise, for example, a metal material, a polymer material, a composite material, or combinations thereof. Embodiments, however, are not limited therewith, and thus, this disclosure contemplates the second stand member 26 being composed of any suitable material(s) that falls within the spirit and scope of the principles of this disclosure set forth herein.

Additionally or alternatively, the outer protective frame 20 further comprise a strap holder 23 extending outwardly from each longitudinal sidewall thereof. Each strap holder 23 defines a through hole sized to receive an adjustable elongated strap member 13 to permit hands-free support of the mobile device holder 10 by a user at a first support area 14 at the neck region of the user and a second support area 15 at the back of the user (FIG. 11). Due to such hands-free support, the user 12 may be engaged in A-V conversations, watch videos, record videos, take pictures, browsing the Internet, etc., all while also engaged in activities such as, for example, running, walking, skiing, surfing, skydiving, ziplining, etc.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A portable mobile device holder, comprising:
   an outer protective frame, haying a substantially rectangular-shaped body defining an opening, the substantially rectangular-shaped body haying a plurality of frame protector members arranged at corners thereof;
   an intermediate protective frame, concentrically received in the opening of the outer protective frame and defining an opening, the intermediate protective frame being selectively moveable by a user between a stowed position and a deployed position in which the intermediate protective frame is pivoted outwardly relative to the outer protective frame to orient the mobile device at an approximately 90 degree position relative to the outer protective frame and facilitate hands-free use of the mobile device by a user; and
   an inner protective frame, concentrically received in the opening of the intermediate protective frame and defining an opening into which the mobile device is mounted, the inner protective frame being selectively moveable by the user between a stowed position and a deployed position in which the inner protective frame is selectively rotated by the user between approximately 0 to 360 degrees about its longitudinal axis relative to the intermediate protective frame.

2. The portable mobile device holder of claim 1, wherein the inner protective frame comprises:
   a first lock device, selectively moveable in a vertical direction relative to the inner protective frame, to engage and lock the mobile device to the inner protective frame; and
   a second lock device, selectively moveable in a lateral direction relative to the inner protective frame, to engage and lock the mobile device to the inner protective frame.

3. The portable mobile device holder of claim 1, wherein the outer protective frame comprises:
   spaced-apart connection members extending towards the opening of the outer protective frame to facilitate connection of the intermediate protective frame to the outer protective frame and the outward pivoting of the intermediate protective frame relative to the outer protective frame, and
   a stop member, extending substantially perpendicularly from the outer protective frame, to engage and maintain the intermediate protective frame at an approximately 90 degree position relative to the outer protective frame.

4. The portable mobile device holder of claim 1, further comprising a first stand member, operatively connected to the outer protective frame, and moveable between a stowed position at a rear surface of the outer protective frame, and a deployed position in which the first stand member is pivoted outwardly from the outer protective frame to support the portable mobile device holder at a portrait orientation.

5. The portable mobile device holder of claim 4, further comprising a second stand member, operatively connected to the outer protective frame, and moveable between a stowed position at a rear surface of the outer protective frame, and a deployed position in which the second stand member is pivoted outwardly from the outer protective frame to support the portable mobile device holder at a landscape orientation.

6. The portable mobile device holder of claim 1, wherein the intermediate protective frame comprises a lock/release member, configured to engage the outer protective frame and maintain the intermediate protective frame in the stowed position, and selectively release the intermediate protective frame from the stowed position to the deployed position when engaged by the user.

7. A portable mobile device holder, comprising:
   an outer protective frame, having a substantially rectangular-shaped body defining an opening configured to concentrically receive an inner protective frame, which itself defines an opening into which the mobile device is mounted, the inner protective frame being selectively moveable by the user between a stowed position and a deployed position in which the inner protective frame is selectively rotated by the user between approximately 0 to 360 degrees about its longitudinal axis relative to the outer protective frame. the substantially rectangular-shaped body having a plurality of frame protector members arranged at corners thereof.

8. The portable mobile device holder of claim 7, wherein the inner protective frame comprises:
   a first lock device, selectively moveable in a vertical direction relative to the inner protective frame, to engage and lock the mobile device to the inner protective frame, and
   a second lock device, selectively moveable in a lateral direction relative to the inner protective frame, to engage and lock the mobile device to the inner protective frame.

9. The portable mobile device holder of claim 7, further comprising a first stand member, operatively connected to the outer protective frame, and moveable between a stowed position at a rear surface of the outer protective frame, and a deployed position in which the first stand member is pivoted outwardly from the outer protective frame to support the portable mobile device holder at a portrait orientation.

10. The portable mobile device holder of claim 9, further comprising a second stand member, operatively connected to the outer protective frame, and moveable between a stowed position at a rear surface of the outer protective frame, and a deployed position in which the second stand member is pivoted outwardly from the outer protective frame to support the portable mobile device holder at a landscape orientation.

11. A portable mobile device holder, comprising:
   a plurality of individual frames, concentrically-connected to each other to receive the mobile device at an inner protective frame of the individual frames, wherein an intermediate protective frame of the individual frames is selectively moveable by a user between a stowed position and a deployed position in which the intermediate protective frame is pivoted outwardly relative to an outer protective frame of the individual frames to thereby orient the mobile device at an approximately 90 degree position relative to the outer protective frame and facilitate hands-free use of the mobile device by a user, wherein the inner protective frame includes a first lock device, selectively moveable in a vertical direction relative to the inner protective frame, to engage and lock the mobile device to the inner protective frame, and a second lock device, selectively moveable in a lateral direction relative to the inner protective frame, to engage and lock the mobile device to the inner protective frame.

12. The portable mobile device holder of claim 11, wherein the inner protective frame is selectively moveable by the user between a stowed position and a deployed position in which the inner protective frame is selectively rotated by the user between approximately 0 to 360 degrees about its longitudinal axis relative to the intermediate protective frame.

13. The portable mobile device holder of claim 11, wherein the outer protective frame comprises a substantially rectangular-shaped body having a plurality of frame protector members arranged at corners thereof.

14. The portable mobile device holder of claim 11, wherein the outer protective frame comprises:
   spaced-apart connection members extending towards the opening of the outer protective frame to facilitate connection of the intermediate protective frame to the outer protective frame and the outward pivoting of the intermediate protective frame relative to the outer protective frame, and
   a stop member, extending substantially perpendicularly from the outer protective frame, to engage and maintain the intermediate protective frame at approximately 90 degree position relative to the outer protective frame.

15. The portable mobile device holder of claim 11, further comprising a first stand member, operatively connected to the outer protective frame, and moveable between a stowed position at a rear surface of the outer protective frame, and a deployed position in which the first stand member is pivoted outwardly from the outer protective frame to support the portable mobile device holder at a portrait orientation.

16. The portable mobile device holder of claim 15, further comprising a second stand member, operatively connected to the outer protective frame, and moveable between a stowed position at a rear surface of the outer protective frame, and a deployed position in which the second stand member is pivoted outwardly from the outer protective frame to support the portable mobile device holder at a landscape orientation.

17. The portable mobile device holder of claim 11, wherein the intermediate protective frame comprises a lock/release member, configured to engage the outer protective frame and maintain the intermediate protective frame in the stowed position, and selectively release the intermediate protective frame from the stowed position to the deployed position when engaged by the user.

* * * * *